United States Patent
Wu et al.

(10) Patent No.: US 8,521,932 B2
(45) Date of Patent: Aug. 27, 2013

(54) ARBITRATOR AND ARBITRATING METHOD APPLIED TO SYSTEM MANAGEMENT BUS SYSTEM

(75) Inventors: Li-Chien Wu, Taipei (TW); Pai-Ching Huang, Taipei (TW)

(73) Assignee: ASUSTeK Computer Inc., Taipei (TW)

( * ) Notice: Subject to any disclaimer, the term of this patent is extended or adjusted under 35 U.S.C. 154(b) by 173 days.

(21) Appl. No.: 13/050,312

(22) Filed: Mar. 17, 2011

(65) Prior Publication Data
US 2011/0231589 A1 Sep. 22, 2011

(30) Foreign Application Priority Data
Mar. 19, 2010 (TW) .............................. 99108196 A

(51) Int. Cl.
*G06F 13/00* (2006.01)
(52) U.S. Cl.
USPC ............ 710/110; 710/240; 710/200; 710/305
(58) Field of Classification Search
USPC .......................... 710/240–244, 200, 305–306
See application file for complete search history.

(56) References Cited

U.S. PATENT DOCUMENTS

| 6,728,908 B1 * | 4/2004 | Fukuhara et al. ............... 714/48 |
| 7,117,283 B2 * | 10/2006 | Trembley ..................... 710/110 |
| 2007/0255873 A1 | 11/2007 | Chou et al. |

FOREIGN PATENT DOCUMENTS

JP 2003122707 4/2003

* cited by examiner

*Primary Examiner* — Tim T Vo
*Assistant Examiner* — Kim Huynh
(74) *Attorney, Agent, or Firm* — Jianq Chyun IP Office

(57) ABSTRACT

A system management bus (SM Bus) system includes an arbitrator; a slave device connected to the arbitrator via an SM Bus; a first master device connected to the arbitrator capable of sending a first start command for communicating with the slave device; and a second master device connected to the arbitrator capable of sending a second start command for communicating with the slave device. The arbitrator set the first master device to have a priority, and when the first start command is being executed and the arbitrator receives the second start command, the arbitrator confirms whether the SM Bus is busy or not after a second predetermined time, and if the SM Bus is not busy, the arbitrator transmits the second start command to the slave devices via the SM Bus.

9 Claims, 5 Drawing Sheets

U S 8,521,932 B2

ARBITRATOR AND ARBITRATING METHOD APPLIED TO SYSTEM MANAGEMENT BUS SYSTEM

FIELD OF THE INVENTION

The invention relates to a system management bus (SM Bus) system and, more particularly, to an arbitrator and an arbitration method applied in a SM Bus system.

BACKGROUND OF THE INVENTION

The SM Bus is a two-wire bus. It is disposed at a motherboard of a computer and can communicate between low-bandwidth devices. The low-bandwidth devices at the motherboard includes a power chip, a temperature detecting chip, a fan control chip, a voltage detecting chip and so on.

FIG. 1 is a schematic diagram showing a conventional SM Bus system in a computer. The components connected to the SM Bus can be divided to master devices and slave devices. In FIG. 1, the SM Bus connects the first master device 12, the second master device 14, the first slave device 16, the second slave device 18, the third slave device 20, and the fourth slave device 22. Any of the master devices can communicate with any of the slave devices at the SM Bus.

FIG. 2 is a schematic diagram showing a start command protocol of the communication between the master devices and the slave devices of the SM bus. The start command protocol includes 20 bits. The 10th bit and the 19th bit are sent by the slave devices, and other bits are sent by the master devices. The first bit represents the start condition, next 7 bits stand represents the slave address, next one bit represents the read/write (R/W) command ("1" represents reading, and "0" represents writing), next 1 bit represents an acknowledge bit ("1" represents the acknowledge signal (ACK), and "0" represents the none acknowledgement status (NACK)), next 8 bits are the data bytes, next 1 bit is the acknowledge bit ("1" represents the ACK, and "0" represents the NACK), and the last 1 bit represents the stop condition.

The master device 12 and 14 can send a start command to the slave device 16, 18, 20 and 22 at the SM Bus using the protocol above. The start command includes an address representing a specific slave device at the SM bus. For example, the first master device 12 may send a start command at the SM Bus, and the first address of the start command represents the first slave device 16.

Since all the slave devices 16, 18, 20 and 22 are connected to the SM Bus, all of them can receive the start command sent by the first master device 12. When the slave device 16, 18, 20 and 22 receive the first address, the first slave device sends the ACK instantly, and the first slave device 16 starts to execute the command and communicates with the first master device 12. If the first slave device 16 cannot execute the command sent by the first master device 12 due to the busy state or the damage, the first slave device 16 sends the NACK. Thus, the command sent by the first master device 12 is interrupted, and the interruption command may result in an error, and the system is even unstable.

Except for the damage of the slave device, the command is interrupted mainly since the SM Bus connects two master devices at the same time. When the two master devices communicate to one slave device simultaneously, a bus collision happens. For example, the first master device 12 and the second master device 14 send the start commands at the same time, and the addresses of the start commands are the first addresses. At the moment, the first slave device sends the ACK to one master device (such as the first master device), but it cannot send the NACK to the second master device at the same time. Thus, the second master device cannot execute or stop executing the command in a predetermined time, which causes an error or a system crash.

SUMMARY OF THE INVENTION

An arbitrator and the arbitration method thereof applied in a SM Bus are provided. When a master device sends a start command, it is confirmed by the arbitrator first and transmits the start command to the slave devices at a proper time to avoid the bus collision.

A SM Bus system is provided. The SM Bus includes an arbitrator; a slave device connected to the arbitrator via a SM Bus; a first master device connected to the arbitrator and sending a first start command to communicate with the slave device; and a second master device connected to the arbitrator and sending a second start command for communicating with the slave device; the arbitrator sets the first master device to have a priority, and when the first start command is being executed and the arbitrator receives the second start command, the arbitrator confirms whether the SM Bus is busy or not after a second predetermined time, and if the SM Bus is not busy, the arbitrator transmits the second start command to the slave device via the SM Bus.

Another SM Bus system is provided. The SM Bus system includes a slave device connected to a SM Bus; a first master device sending a first start command; and an arbitrator including a second master device sending a second start command, and the arbitrator receives and allocates the first start command and the second start command to the slave device; when the first start command is being executed and the second start command is generated, the second start command is transmitted to the slave device via the SM Bus when the SM Bus is not busy after a second predetermined time.

An arbitration method for a SM Bus system including an arbitrator connected to a first master device and a second master device, respectively, and connected to a slave device via a SM Bus is provided. The arbitration method includes the following steps. First, determining whether a start command is sent by the first master device when receiving the start command; second, confirming whether the SM Bus is busy or not when the start command is sent by the first master device, transmitting the start command to the slave device if the SM Bus is not busy, and reconfirming whether the SM Bus is busy or not after delaying the start command for a first predetermined time if the SM Bus is busy, and if the SM Bus is not busy after the first predetermined time, transmitting the start command to the slave device; if the SM Bus is busy after the first predetermined time, releasing the SM Bus occupied by the second master device and transmitting the start command to the slave device; third, confirming whether the SM Bus is busy or not when the start command is not sent by the first master device, transmitting the start command to the slave device if the SM Bus is not busy, delaying the start command for a second predetermined time if the SM Bus is busy, and if the SM Bus is not busy after the second predetermined time, transmitting the start command to the slave device; if the SM Bus is busy after the second predetermined time, ending the start command.

These and other features, aspects and advantages of the present invention will become better understood with regard to the following description, appended claims, and accompanying drawings.

DETAILED DESCRIPTION OF THE PREFERRED EMBODIMENT

Figure 3A:
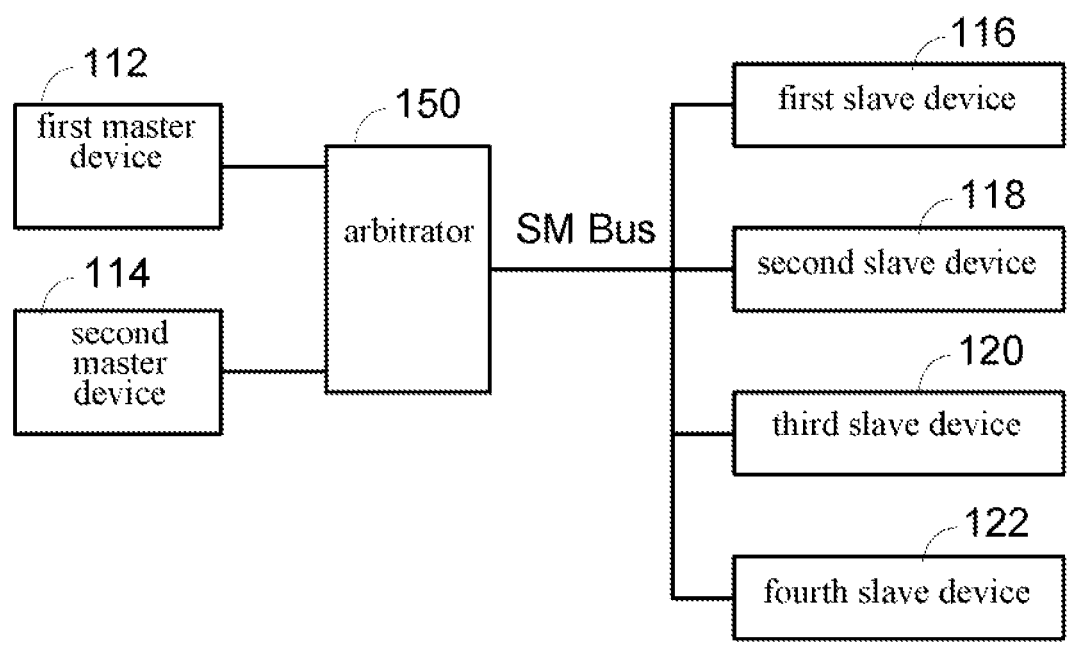
FIG. 3A is a schematic diagram showing a SM Bus system in a first embodiment of the invention.

FIG. 3A is a schematic diagram showing a SM Bus system in a first embodiment of the invention. The first master device 112 and the second master device 114 are connected to an arbitrator 150, respectively, and the arbitrator 150 is connected to the slave devices 116, 118, 120 and 122. In the arbitrator 150, the first master device 112 is set to have a higher priority. In the embodiment, the first master device 112 has a higher priority, which is not limited herein. The second master device 114 may also be set to have a higher priority. The arbitrator 150 is an embedded controller (EC) which achieves the needed function of the arbitrator 150 by executing a firmware of the EC.

The arbitrator 150 provides a bypass mode and an extend mode to the first master device 112 and the second master device 114. Taking the first master device 112 as an example, when the first master device 112 is in the bypass mode, all of the signals generated by the first master device 112 are transmitted to the slave devices 116, 118, 120 and 122; when the first master device 112 is in the extend mode, a clock (CLK) signal low level sent by the first master device 112 is transmitted to the slave devices 116, 118, 120 and 122 after a predetermined time. The predetermined time is defined in a specification, and it is the allowable waiting time in which the master device allows the slave device to send a response. Different master devices may have different predetermined delay time.

Figure 1:
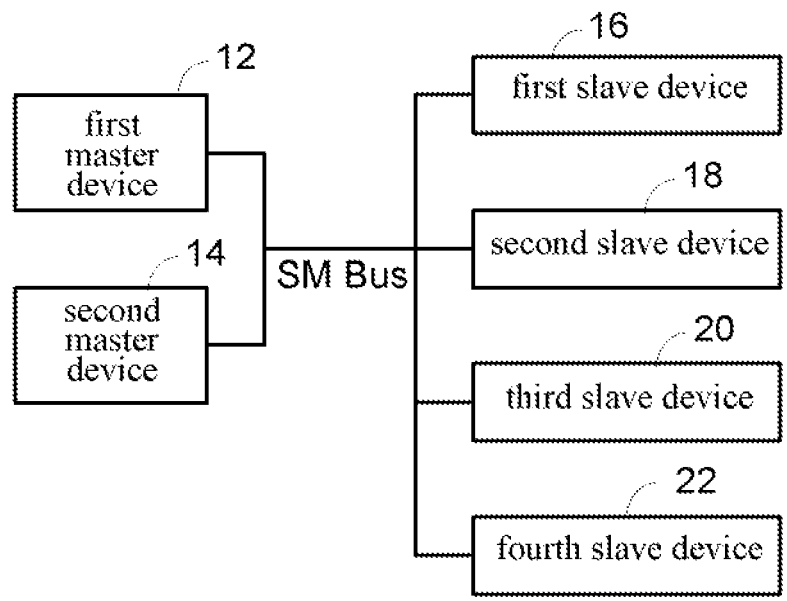
FIG. 1 is a schematic diagram showing a conventional SM Bus system in a computer.
Figure 2:
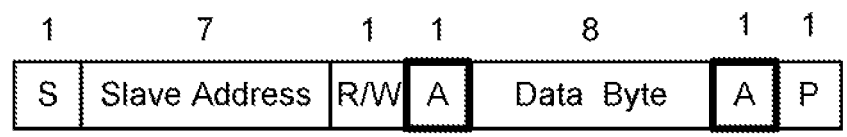
FIG. 2 is a schematic diagram showing a start command protocol of the communication between a master device and a slave device of a SM bus.
Figure 3B:
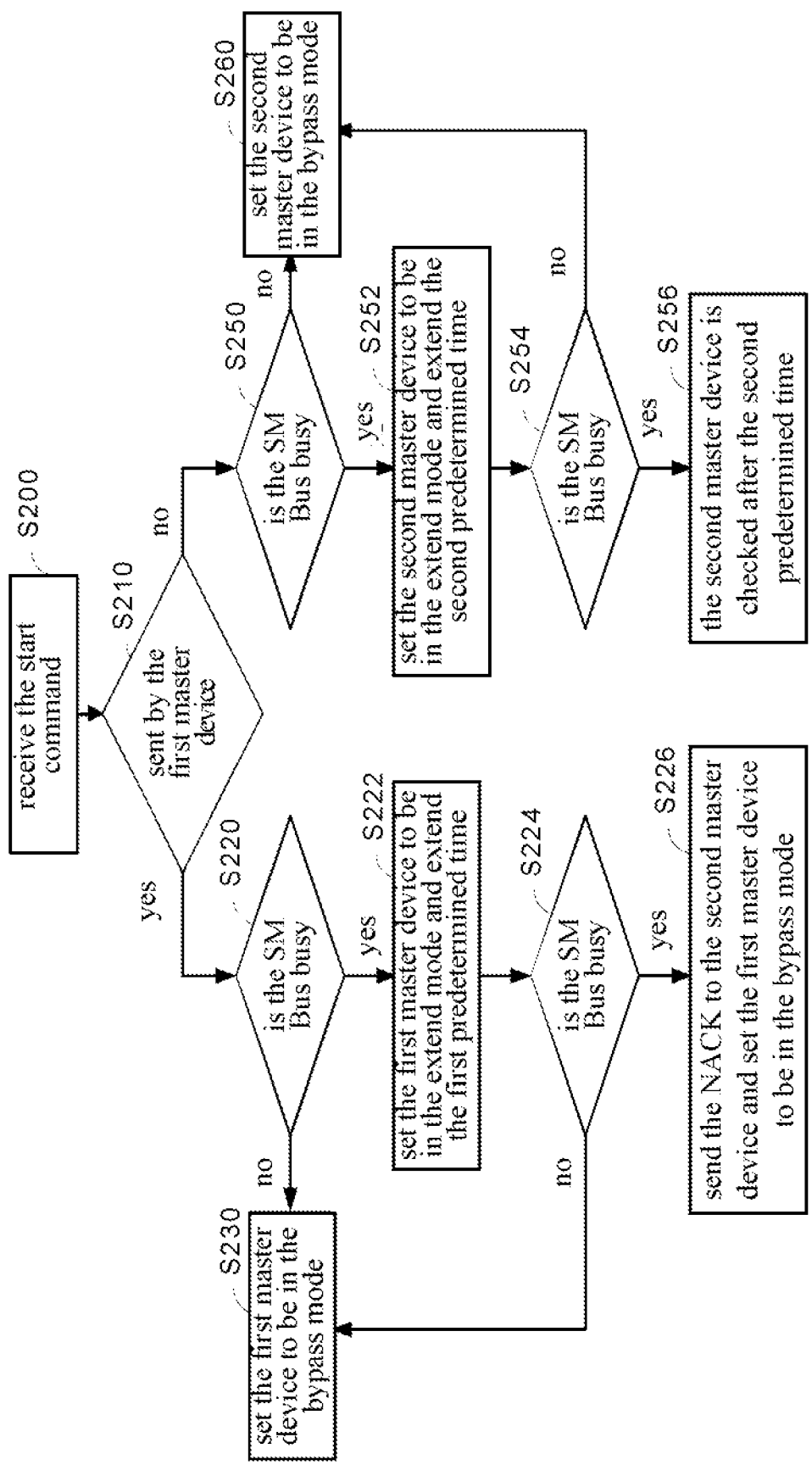
FIG. 3B is a logic diagram showing the arbitration method in a first embodiment of the invention.

FIG. 3B is a logic diagram showing the arbitration method in a first embodiment of the invention. Since the first master device 112 is set to have a higher priority, the arbitrator 150 allows the commands sent by the first master device 112 to be executed preferentially. Thus, as shown in FIG. 2B, when the arbitrator 150 receives the start command (Step S200), it should confirm that the start command is sent by the first master device 112 or the second master device 114 (Step S210).

When the first master device 112 sends the start command, the arbitrator 150 confirms whether the SM Bus connected to the slave device is busy or not (Step S220). If the SM Bus is not busy, the first master device 112 is set to be in the bypass mode (Step S230), and thus the start command sent by the first master device 112 is transmitted to the slave devices via the SM Bus. The first master device 112 executes the command with the specific slave device successfully.

On the contrary, if the SM Bus is busy, which means that the second master device 114 is acting, the first master device 112 is set to be in the extend mode (Step S222). The start command is temporally stored in the arbitrator 150. After the first predetermined time, the arbitrator 150 reconfirms if the SM Bus is busy or not (Step S224). If the SM Bus is not busy, it means that the second master device 114 does not occupy the SM Bus. Thus, the first master device 112 is set to be in the bypass mode (Step S230), the start command sent by the first master device 112 is transmitted to all the slave devices via the SM Bus, and the first master device 112 executes the command with the specific slave device successfully. On the contrary, after the first predetermined time, when the SM Bus is still busy, and the address of the start command sent by the second master device 114 and the address of the command executed by the first master device 112 correspond to the same slave device, the arbitrator 150 replies a NACK to the second master device 114 to force the second master device 114 to release the SM Bus. The first master device 112 is set to be in the bypass mode (Step S226), and then the start command sent by the first master device 112 is transmitted to the slave device via the SM Bus, and the first master device 112 executes the command with the specific slave device successfully.

When the arbitrator 150 confirms that the second master device 114 sends the start command, the arbitrator 150 needs to confirm whether the SM Bus connected to the slave device is busy or not (Step S250). If the SM Bus is not busy, the second master device 114 is set to be in the bypass mode (Step S260), and thus the start command sent by the second master device 114 is transmitted to the slave devices via the SM Bus. The second master device 114 executes the command with the specific slave device successfully.

On the contrary, if the SM Bus is busy, which means that the first master device 112 is acting, the second master device 114 is set to be in the extend mode (Step S252). The start command is temporally stored in the arbitrator 150. After the second predetermined time, the arbitrator 150 reconfirms if the SM Bus is busy (Step S254). If the SM Bus is not busy, it means that the first master device 112 does not occupy the SM Bus. Thus, the second master device 114 is set to be in the bypass mode (Step S260), the start command sent by the second master device 114 is transmitted to the slave devices via the SM Bus, and the second master device 114 executes the command with the specific slave device successfully. On the contrary, after the second predetermined time, if the SM Bus is still busy, which means that the first master device 112 is communicating with one of the slave devices of the SM Bus, and the address of the start command sent by the second master device 114 and the address of the command executed by the first master device 112 correspond to the same slave device, and the second master device 114 is confirmed to wait longer than the second predetermined time, a timeout mechanism of the SM bus stops the command, the arbitrator 150 waits for the next start command sent by the second master device 114 again.

From the first embodiment of the invention, since the first master device 112 has a higher priority, the arbitrator 150 allows the commands sent by the first master device 112 to be executed preferentially.

Figure 4A:
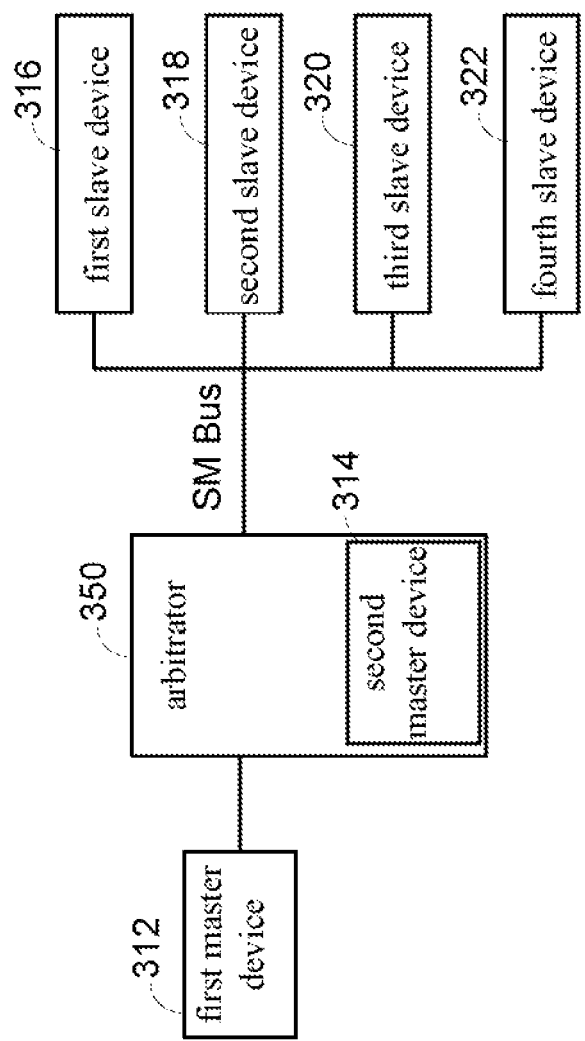
FIG. 4A is a schematic diagram showing a SM Bus system in a second embodiment of the invention.

FIG. 4A is a schematic diagram showing a SM Bus system in a second embodiment of the invention. The second master device 314 is disposed in the arbitrator 350, which means the EC may have all the functions of the arbitrator 350 and controlling the second master device 314 via programming the firmware of the EC.

As shown in FIG. 4A, the first master device 312 is connected to the arbitrator 350, the arbitrator 350 is connected to the slave devices 316, 318, 320 and 322. Since the second master device 314 is disposed in the arbitrator 350, the second master device 314 may be controlled by the arbitrator 350 directly, and the first master device 312 is set to have a higher priority.

The arbitrator 350 provides the bypass mode and the extend mode to the first master device 312 and the second master device 314. Taking the first master device 312 as an example, when the first master device 312 is in the bypass mode, all of the signals sent by the first master device 312 are transmitted to the slave devices 316, 318, 320 and 322; when the first master device 312 is in the extend mode, a clock (CLK) signal low level sent by the first master device 312 is transmitted to the slave devices 316, 318, 320 and 322 after a predetermined time. The predetermined time is defined in a specification, and it is the allowable waiting time in which the master device allows the slave device to send a response. Different master devices may have different predetermined delay time.

Figure 4B:
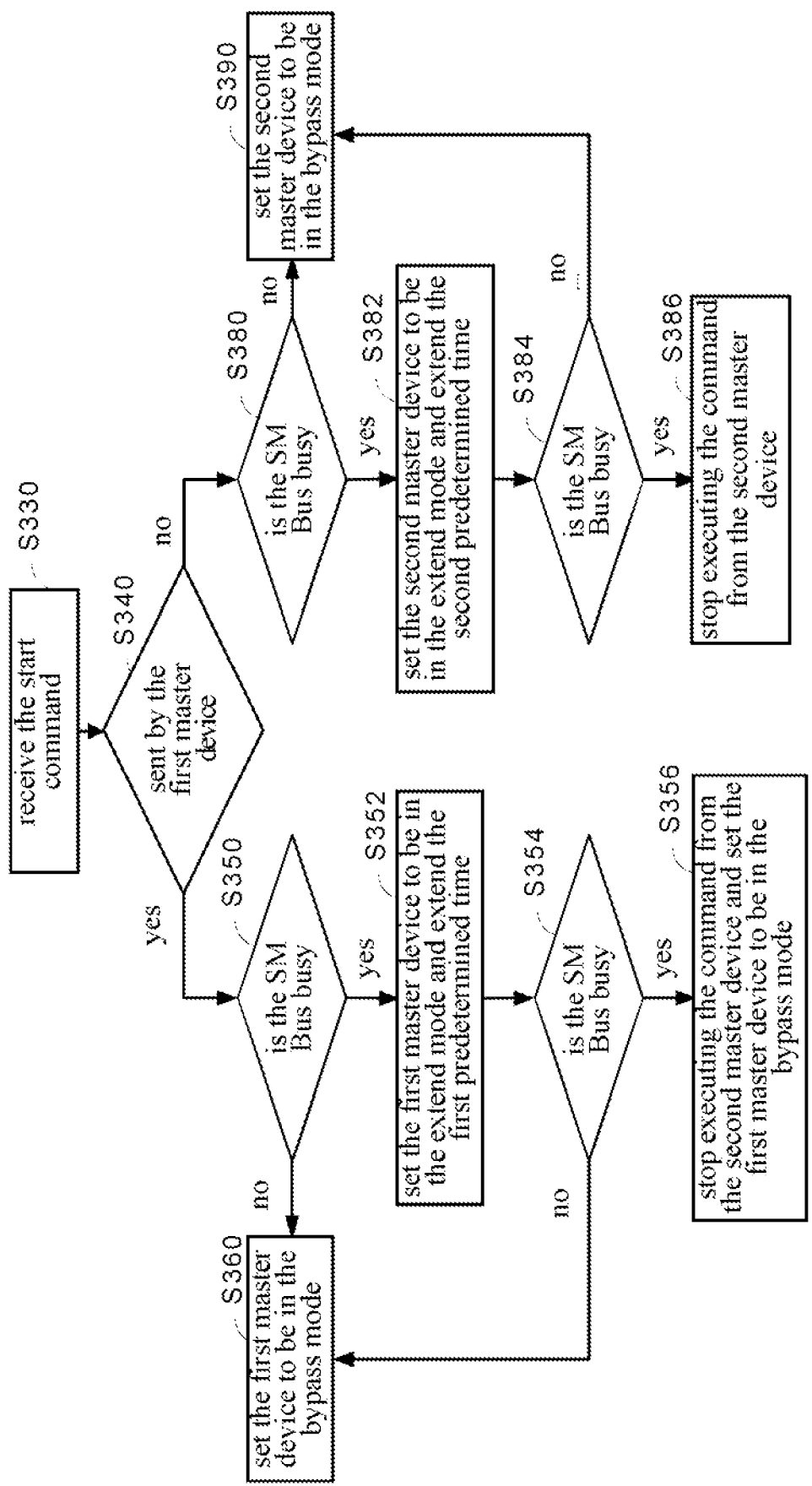
FIG. 4B is a logic diagram showing the arbitration method in a first embodiment of the invention.

FIG. 4B is a logic diagram showing the arbitration method in a second embodiment of the invention. Since the first master device 312 is set to have a higher priority, the arbitrator 350 allows the commands sent by the first master device 312 to be executed preferentially. Thus, as shown in FIG. 4B, when the arbitrator 350 receives the start command (Step S330), it is needed to confirm that the start command is sent by the first master device 312 or the second master device 314 (Step S340).

When the first master device 312 sends the start command, the arbitrator 350 confirms whether the SM Bus connected to the slave device is busy or not (Step S350). If the SM Bus is not busy, the first master device 312 is set to be in the bypass mode (Step S360), and thus the start command sent by the first master device 312 is transmitted to the slave devices via the SM Bus. The first master device 312 executes the command with the specific slave device successfully.

On the contrary, if the SM Bus is busy, which means that the second master device 314 is acting, the first master device 312 is set to be in the extend mode (Step S352). The start command is temporally stored in the arbitrator 350. After the first predetermined time, the arbitrator 350 confirms again whether the SM Bus is busy (Step S354). If the SM Bus is not busy, it means that the second master device 314 does not occupy the SM Bus. Thus, the first master device 312 is set to be in the bypass mode (Step S360), the start command sent by the first master device 312 is transmitted to the slave devices via the SM Bus, and the first master device 312 executes the command with the specific slave device successfully. On the contrary, after the first predetermined time, if the SM Bus is still busy, the arbitrator 350 controls the second master device 314 directly to stop executing the command and release the SM Bus, and when the SM Bus is not busy, the arbitrator 350 resends the stopped start command of the second master device 314, and the first master device 312 is set to be in the bypass mode (Step S356). As a result, the start command sent by the first master device 312 is transmitted to the slave device via the SM Bus, and the first master device 312 executes the command with the specific slave device successfully.

When the arbitrator 350 confirms that the second master device 314 sends the start command, the arbitrator 350 needs to confirm whether the SM Bus connected to the slave device is busy or not (Step S380). If the SM Bus is not busy, the second master device 314 is set to be in the bypass mode (Step S390), and thus the start command sent by the second master device 314 is transmitted to the slave devices via the SM Bus. The second master device 314 executes the command with the specific slave device successfully.

On the contrary, if the SM Bus is busy, which means the first master device 312 is acting, the second master device 314 is set to be in the extend mode (Step S382). The start command is temporally stored in the arbitrator 350. After the second predetermined time, the arbitrator 350 reconfirms if the SM Bus is busy (Step S384). If the SM Bus is not busy, it means that the first master device 312 does not occupy the SM Bus. Thus, the second master device 314 is set to be in the bypass mode (Step S390), the start command sent by the second master device 314 is transmitted to the slave devices via the SM Bus, and the second master device 314 executes the command with the specific slave device successfully. On the contrary, after the second predetermined time, when the SM Bus is still busy, which means that the first master device 312 is communicating with one of the slave devices of the SM Bus, and the address of the start command sent by the second master device 114 and the address of the command executed by the first master device 312 correspond to the same slave device, the arbitrator 350 controls the second master device 314 directly to stop executing the start command, and resenting the stopped start command of the second master device 314 by the arbitrator 350 when the SM Bus is not busy.

From the second embodiment of the invention, since the second master device 314 is disposed in the arbitrator 350, the arbitrator 350 can control the second master device 314 directly, and it does not need to send the NACK.

Consequently, an arbitrator and an arbitration method applied in the SM Bus are provided. Since the first master device and the second master device are connected to the arbitrator, respectively, the arbitrator easily distinguishes the order of the start commands sent by the master devices and which master device sends the start command. Moreover, when the master device sends the start command, it is determined by the arbitrator first and transmitted to all of the slave devices at a proper time, which avoids the bus collision. The embodiments of the invention take multiple slave devices as an example. However, in practical usage, the arbitrator also may be only connected to one slave device, and the arbitration method also may achieve the same function.

Although the present invention has been described in considerable detail with reference to certain preferred embodiments thereof, the disclosure is not for limiting the scope of the invention. Persons having ordinary skill in the art may make various modifications and changes without departing from the scope. Therefore, the scope of the appended claims should not be limited to the description of the preferred embodiments described above.

What is claimed is:

1. A system management bus (SM Bus) system, comprising:
   an arbitrator;
   a slave device connected to the arbitrator via a SM Bus;
   a first master device connected to the arbitrator and sending a first start command for communicating with the slave device; and
   a second master device connected to the arbitrator and sending a second start command for communicating with the slave device;
   wherein the arbitrator sets the first master device to have a priority, when the first start command is being executed and the arbitrator receives the second start command, the arbitrator confirms whether the SM Bus is busy or not after a second predetermined time, if the SM Bus is not busy, the arbitrator transmits the second start command to the slave device via the SM Bus,
   wherein when the second start command is being executed and the arbitrator receives the first start command, the arbitrator transmits the first start command to the slave device via the SM Bus when the arbitrator confirms the SM Bus is not busy after a first predetermined time, when the arbitrator confirms the SM Bus is busy after the first predetermined time, the arbitrator sends a none acknowledgement signal (NACK) to the second master device to stop the second master device using the SM Bus, and transmits the first start command to the slave device via the SM Bus.

2. The SM Bus system according to claim 1, wherein if the arbitrator confirms the SM Bus is busy after the second predetermined time, the arbitrator sets that the second start command is not executed.

3. The SM Bus system according to claim 1, wherein when the first start command is executed completely and the arbitrator receives the second start command, the arbitrator transmits the second start command to the slave device via the SM Bus.

4. The SM Bus system according to claim 1, wherein when the second start command is executed completely and the arbitrator receives the first start command, the arbitrator transmits the first start command to the slave device via the SM Bus.

5. A SM Bus system, comprising:
a slave device connected to a SM Bus;
a first master device sending a first start command; and
an arbitrator including a second master device sending a second start command, wherein the arbitrator receives and allocates the first start command and the second start command to the slave device;
when the first start command is being executed and the second start command is generated, the second start command is transmitted to the slave device via the SM Bus when the SM Bus is not busy after a second predetermined time,
wherein when the second start command is being executed and the arbitrator receives the first start command, the first start command is transmitted to the slave device via the SM Bus when the SM Bus is not busy after a first predetermined time, the second start command execution is stopped when the SM Bus is busy after the first predetermined time, and the first start command is transmitted to the slave device via the SM Bus.

6. The SM Bus system according to claim 5, wherein the second start command is paused to be executed when the SM Bus is busy after the second predetermined time, and the arbitrator transmits the second start command to the slave device via the SM Bus when the arbitrator confirms the SM Bus is not busy.

7. The SM Bus system according to claim 5, wherein when the first start command is executed completely and the arbitrator receives the second start command, the second start command is transmitted to the slave device via the SM Bus.

8. The SM Bus system according to claim 5, wherein when the second start command is executed completely and the arbitrator receives the first start command, the first start command is transmitted to the slave device via the SM Bus.

9. An arbitration method for a SM Bus system including an arbitrator connected to a first master device and a second master device, respectively, and connected to a slave device via a SM Bus, the arbitration method comprising:
determining whether a start command is sent by the first master device when receiving the start command;
confirming whether the SM Bus is busy or not when the start command is sent by the first master device, transmitting the start command to the slave device if the SM Bus is not busy, and reconfirming whether the SM Bus is busy or not after delaying the start command for a first predetermined time if the SM Bus is busy, wherein if the SM Bus is not busy after the first predetermined time, transmitting the start command to the slave device;
if the SM Bus is busy after the first predetermined time, releasing the SM Bus occupied by the second master device and transmitting the start command to the slave device; and
confirming whether the SM Bus is busy or not when the start command is not sent by the first master device, transmitting the start command to the slave device if the SM Bus is not busy, delaying the start command for a second predetermined time if the SM Bus is busy, wherein if the SM Bus is not busy after the second predetermined time, transmitting the start command to the slave device; if the SM Bus is busy after the second predetermined time, ending the start command,
wherein if the SM Bus is busy after the first predetermined time releasing the SM Bus occupied by the second master device by the arbitrator sending a NACK to the second master device to stop the second master device occupying the SM Bus.

* * * * *